United States Patent
Barna et al.

(10) Patent No.: US 6,765,613 B1
(45) Date of Patent: Jul. 20, 2004

(54) LOW LIGHT SENSOR SIGNAL TO NOISE IMPROVEMENT

(75) Inventors: Sandor L. Barna, Pasadena, CA (US); Eric R. Fossum, LaCrescenta, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/359,065

(22) Filed: Jul. 21, 1999

Related U.S. Application Data

(60) Provisional application No. 60/093,842, filed on Jul. 22, 1998.

(51) Int. Cl.[7] .......................... H04N 5/217; H04N 9/64; H04N 5/225; H04N 5/16; H01L 27/00
(52) U.S. Cl. ................ 348/241; 348/216.1; 348/243; 348/248; 348/257; 250/208.1
(58) Field of Search .................. 348/241, 216.1, 348/217.1, 243, 248, 257; 250/208.1

(56) References Cited

U.S. PATENT DOCUMENTS

| | | | |
|---|---|---|---|
| 5,272,535 A | * 12/1993 | Elabd | 348/314 |
| 5,417,215 A | 5/1995 | Evans et al. | |
| 5,708,263 A | * 1/1998 | Wong | 250/208.1 |
| 5,880,777 A | * 3/1999 | Savoye et al. | 348/216.1 |
| 5,909,244 A | * 6/1999 | Waxman et al. | 348/222.1 |
| 5,949,483 A | * 9/1999 | Fossum et al. | 348/303 |
| 6,057,539 A | * 5/2000 | Zhou et al. | 250/208.1 |
| 6,118,115 A | * 9/2000 | Kozuka et al. | 250/208.1 |
| 6,166,769 A | * 12/2000 | Yonemoto et al. | 348/241 |
| 6,201,572 B1 | * 3/2001 | Chou | 348/241 |
| 6,320,617 B1 | * 11/2001 | Gee et al. | 348/302 |
| 6,590,198 B1 | * 7/2003 | Zarnowski et al. | 250/208.1 |

* cited by examiner

*Primary Examiner*—Andrew Christensen
*Assistant Examiner*—Nhan Tran
(74) *Attorney, Agent, or Firm*—Dickstein Shapiro Morin & Oshinsky LLP

(57) ABSTRACT

A number of different elements are added together in a staggered way to avoid the total loss of resolution caused by the binning process. The circuit for doing this includes a variable gain. In a second circuit for carrying this out, to fixed pattern noise reduction circuits are used.

6 Claims, 5 Drawing Sheets

LOW LIGHT SENSOR SIGNAL TO NOISE IMPROVEMENT

CROSS REFERENCE TO RELATED APPLICATIONS

This application claims the benefit of U.S. Provisional Application Serial No. 60/093,842, filed on Jul. 22, 1998.

BACKGROUND

An image sensor can be used in low illumination conditions. It can be necessary to amplify the signal from the sensor used in this way. One typical way of doing this is to "bin" the pixels. For example, a group of four pixels is taken together, and handled as a group. This obtains the signal from all four pixels as an increased-level pixel.

A similar issue can exist when high frame rates are used, where each frame of received signal can be integrated only for a relatively short period of time.

High speed readout produces additional similar issues. Specifically, the high speed readout can be read in bursts. Each of the bursts can be for example a unit, e.g., row or a column, of output of the image sensor. Each unit can be associated with its own unit amplifier to allow the effective unit amplification 20 to be carried out faster. However, unit-to-unit fixed pattern noise can result from mismatched in amplifier voltage offset or gain.

SUMMARY

The present system teaches a device which amplifies according to a combined operation that reduces fixed pattern noise and reduces offsets among the column amplifiers.

BRIEF DESCRIPTION OF THE DRAWINGS

These and other aspects will now be described in detail with reference to the accompanying drawings, wherein.

DESCRIPTION OF THE EMBODIMENTS

A disclosed embodiment reads the pixels out in column-parallel mode, wherein an entire row of pixels is read-out at a single time. The pixels can be active pixels that have a photoreceptor, an in-pixel buffer transistor and an in-pixel selection transistor. The signal-to-noise response of this circuitry can be improved by binning the signals from adjacent units, (here rows) and using the binned result as the output for both rows. This doubles the resulting signal, but adds the noise in quadrature. Hence, the noise only increases by 1.4 while the signal increases by 2.

Previous binning operations have reduced the vertical resolution of the sensor by 2.

A disclosed embodiment described herein performs a post-amplification staggered row addition. This produces a number of outputs, each of which has a different output value. The first output 102 corresponds to a sum of row 1+row 2. The second output corresponds to row 2+row 3. Adders 101 and 103 are shown for carrying out the addition; however, a single adder could be used.

Hence, each row is used twice, and the same, or almost the same, number of binned signals are obtained as rows. The output signal is still, in general, doubled, while the noise increases only by 1.4. However, this system can have a smaller resolution reduction.

Figure 1:
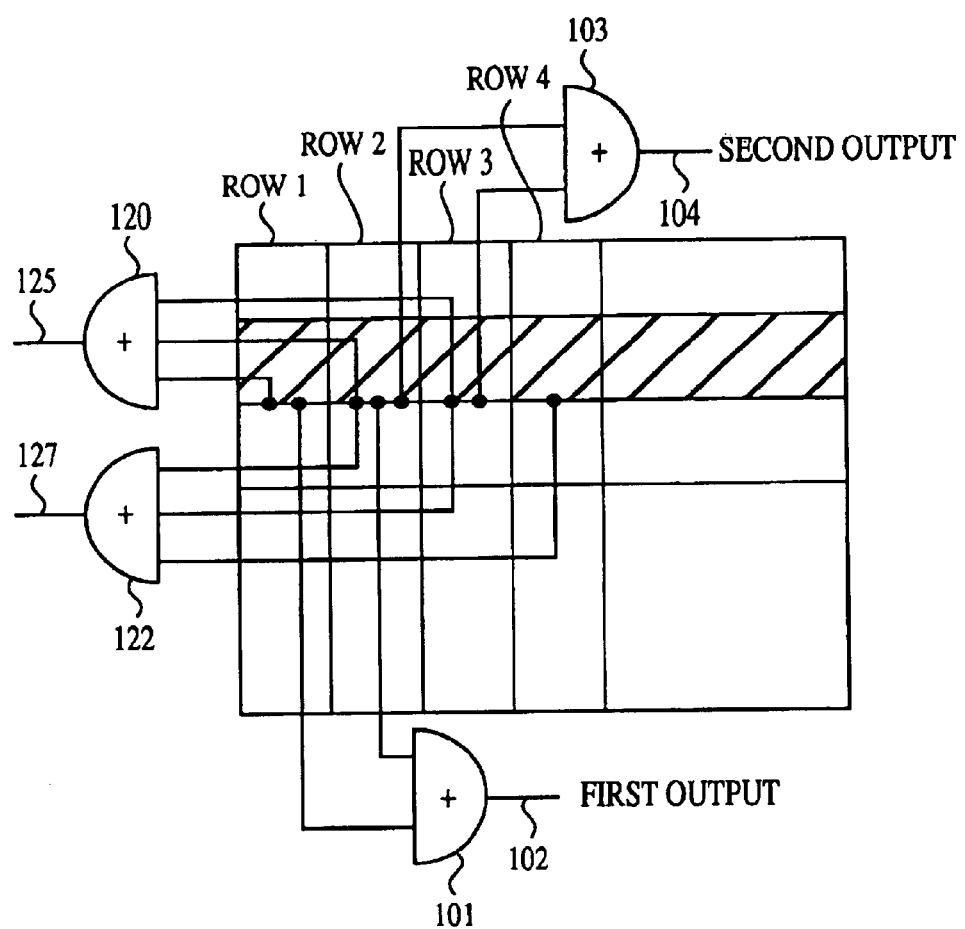
FIG. 1 shows a first embodiment of a multiple binning system.

Another embodiment also shown in the left most part of FIG. 1 generalizes this approach to the addition of more than two rows. For example, in this second embodiment, row 1+row 2+row 3 is added by adder 120, to form a tripled signal 125. Another tripled signal 127 is formed by using adder 122 to add row 2+row 3+row 4. In general, n units are added, and each unit is used n times. However, this trades off image sharpness against noise. This feature effectively carries out a smoothing function and hence can reduce image sharpness.

Figure 2A:
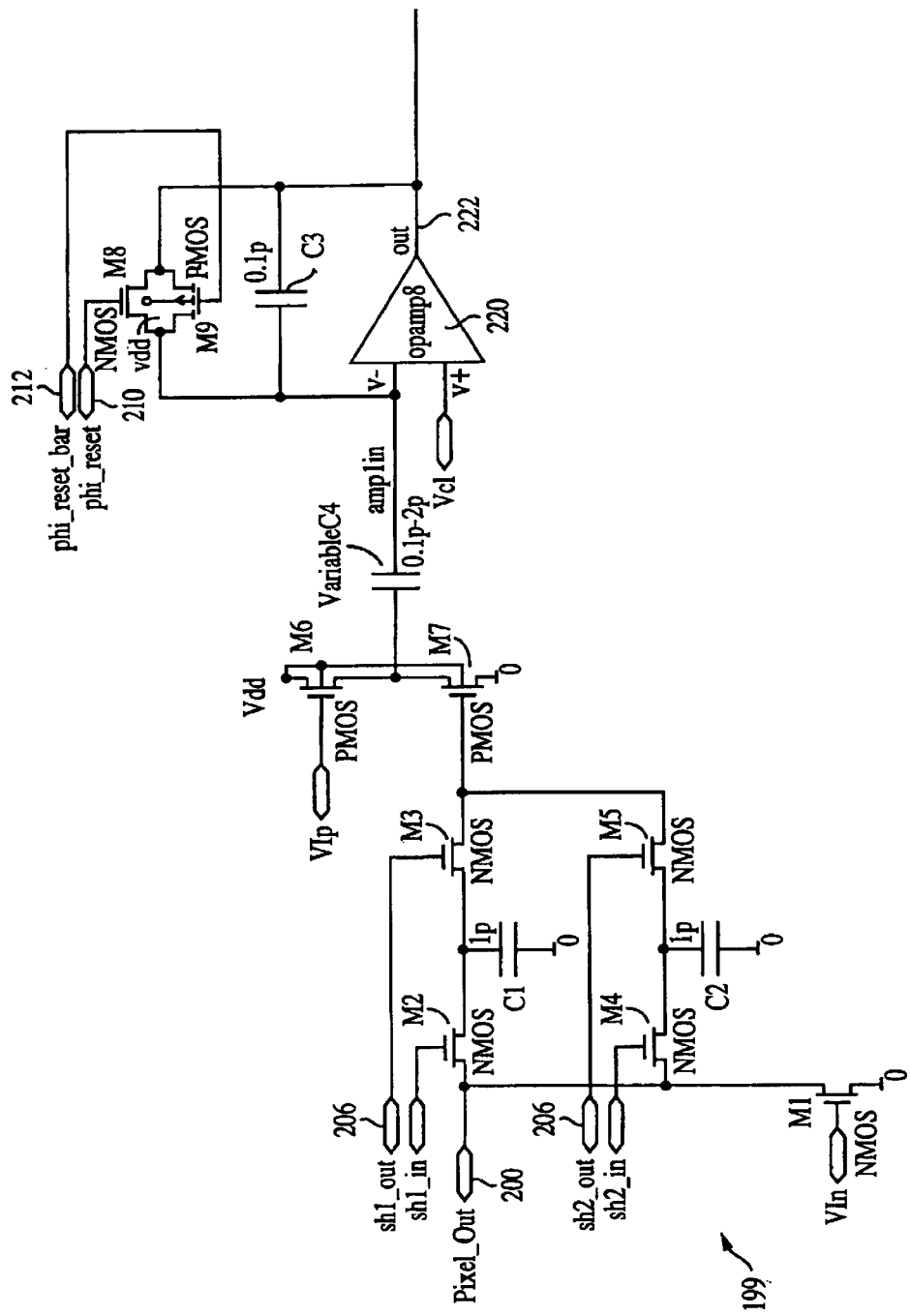
FIGS. 2A and 2B show a circuit for amplification and fixed pattern noise rejection.
Figure 2B:
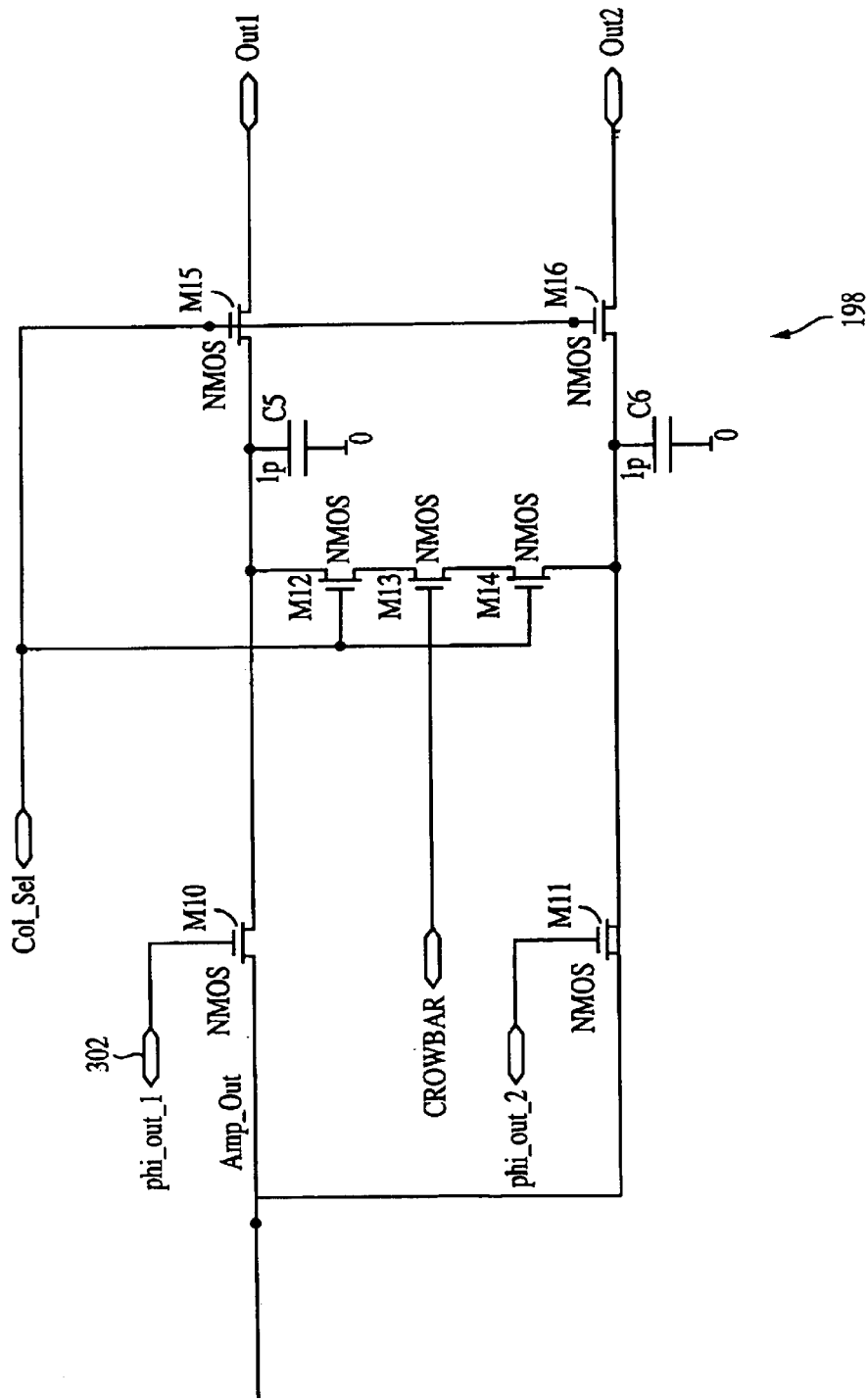

FIGS. 2A and 2B show an embodiment of an amplifier 199 for noise-reduced column wise gain. The operation is described herein with reference to the timing chart of FIG. 3. This timing chart also shows the separation between the row timing, which is carried out simultaneously for all columns, and the column readout timing, which is carried out one column at a time.

Each pixel output is connected to the pixel out node 200. First, the pixel reset voltage is sampled onto the capacitor C1, by turning on the NMOS transistor M2 using the Sh1_in control signal. The signal voltage is subsequently sampled onto capacitor C2 similarly using the Sh2_in control signal via the transistor M4. An amplification cycle is then initiated, by resetting the amplifier using the phi_reset control signal 210 and phi_reset_bar control signal 212. These turn on the CMOS reset switches M8/M9 thereby shorting across the capacitor C3. At the same time, the NMOS switch M3 is turned on via the control signal Sh1_out 206, thereby feeding the reset level to the gate of PMOS follower M7 and charging the capacitor VC4.

The gain of the signal is set by a variable capacitor variableC4. During the reset phase, the amplifier output settles to the reset voltage Vclamp ($V_{CL}$) which is applied to the non-inverting input of the of the op amp 220, plus Vos which represents the offset of the amplifier 220. This voltage level is used to clamp the variable capacitance variable C4. Hence, this voltage is sampled onto capacitor C5 shown in FIG. 2B by turning on the NMOS switch M10. The NMOS switch M10 is controlled by the control signal phi_out_1 302.

The amplifier is then released from reset by allowing phi_reset_bar and phi_reset to go inactive, and by allowing phi_out_1 to go inactive. This begins the amplification phase. First, the pixel signal level is connected to PMOS source follower M7 by making SH1_out inactive to turn off M3, and making SH2_out active to turn on M5. This connects the signal level from pixel out to the PMOS M7 causing its output to slew to a new level. This reduces the charge on one plate of capacitor VC4, pumping the other plate according to form a voltage delta V d⁻ signal-reset. This causes the op amp 220, correspondingly, to settle to a new level. As conventional, the output 222 of the op amp settles to a new level which restores input node B- to its original level (here $V_{CL}$)

The new level at the op amp output 222 corresponds to VCL+Vos+deltaV*(C4/C3). This value is sampled onto capacitor C6 via the NMOS switch M11 controlled by the control signal phi_out_2. The above represents the actions in the rows.

The columns are then processed. The column output is then sampled using a fixed pattern noise rejection crowbar circuitry. The crowbar process shorts the plates of capacitors C5 and C6, providing a voltage shift between the two output nodes, that corresponds to the difference between voltages on C5 and C6. The sum of the two voltage shifts is carried out by turning on all of transistors M12, M13 and M14. This cancels the common components and provides a voltage output equal to deltaV×(C4/C3). All amplifier and transistor offset voltages are completely removed. Hence, the fixed pattern noise only results from column-to-column variations in the value of C4/C3. C3 can be sized to e.g. 0.1 pf, to render this variation insignificant.

The integration/reset speed of this circuit is determined by the gain-bandwidth characteristics (GBW) of the amplifier 220 based on its load. The load can include capacitors C5 or C6 15i depending on the connection. The integration time is approximately equal to gain over CBW. The gain bandwidth of the amplifier in the reset phase of the cycle can lower due to the increased load≈C5+gain*C3. However in reset, the closed loop gain is 1. Hence, the reset time is 1+gain to (1/GBW), which can ten times faster. Hence, reset can be done much faster than sampling.

Figure 4:
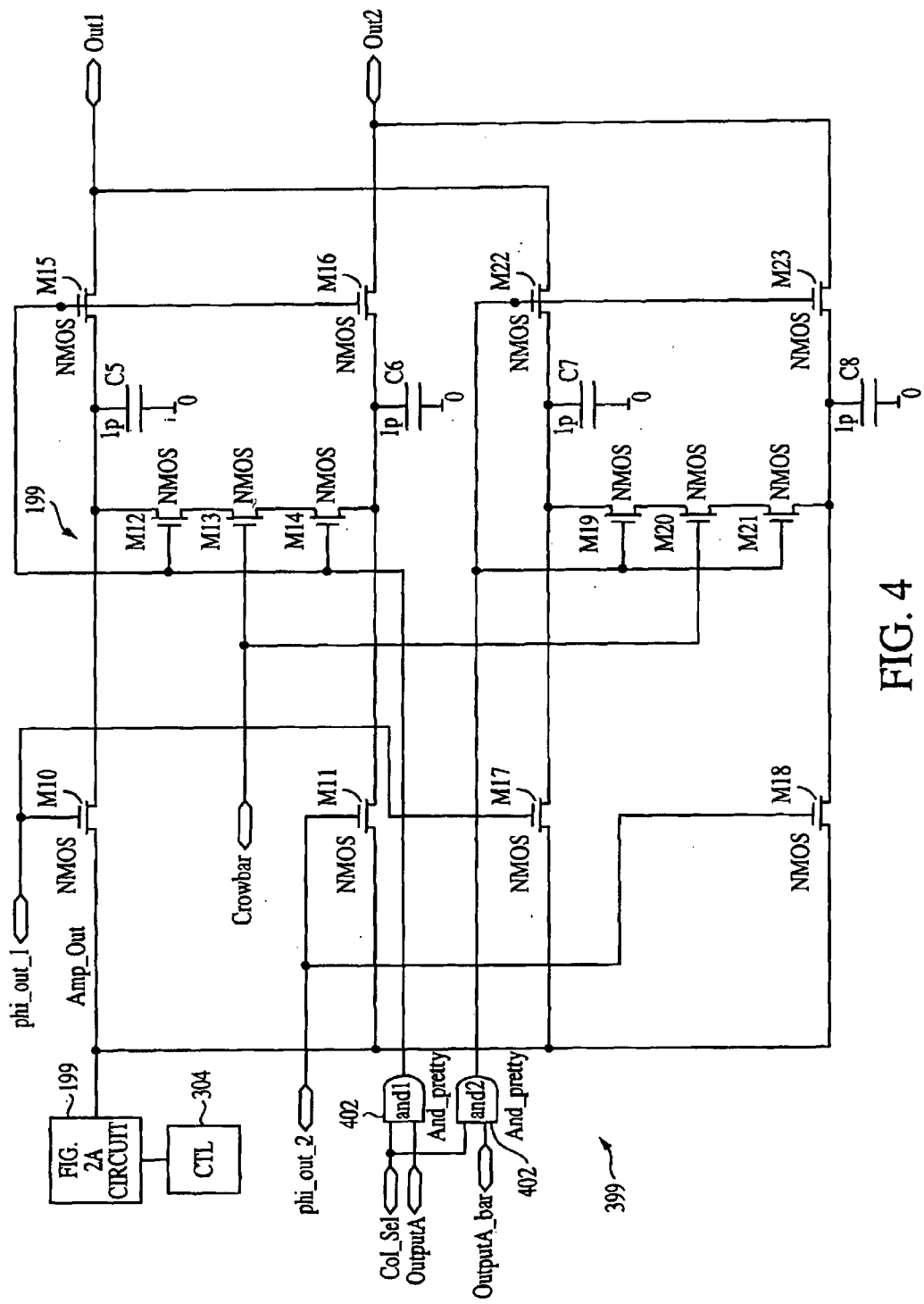
FIG. 4 shows a dual output stage circuit for adding.

FIG. 4 shows this same circuit being used for sequential row addition. The input/amplification stage 199 of FIG. 2A is connected to the FPN stage 198 of FIG. 2B. A second fixed pattern noise rejection circuit 399 is formed in parallel with the first FPN stage 198. Two "and" gates 402, 404 control the selection of the FPN circuits. The first array 198 output is selected using the signal output A. A low value for output A (output_A_bar) selects the second output array 399.

Figure 3:
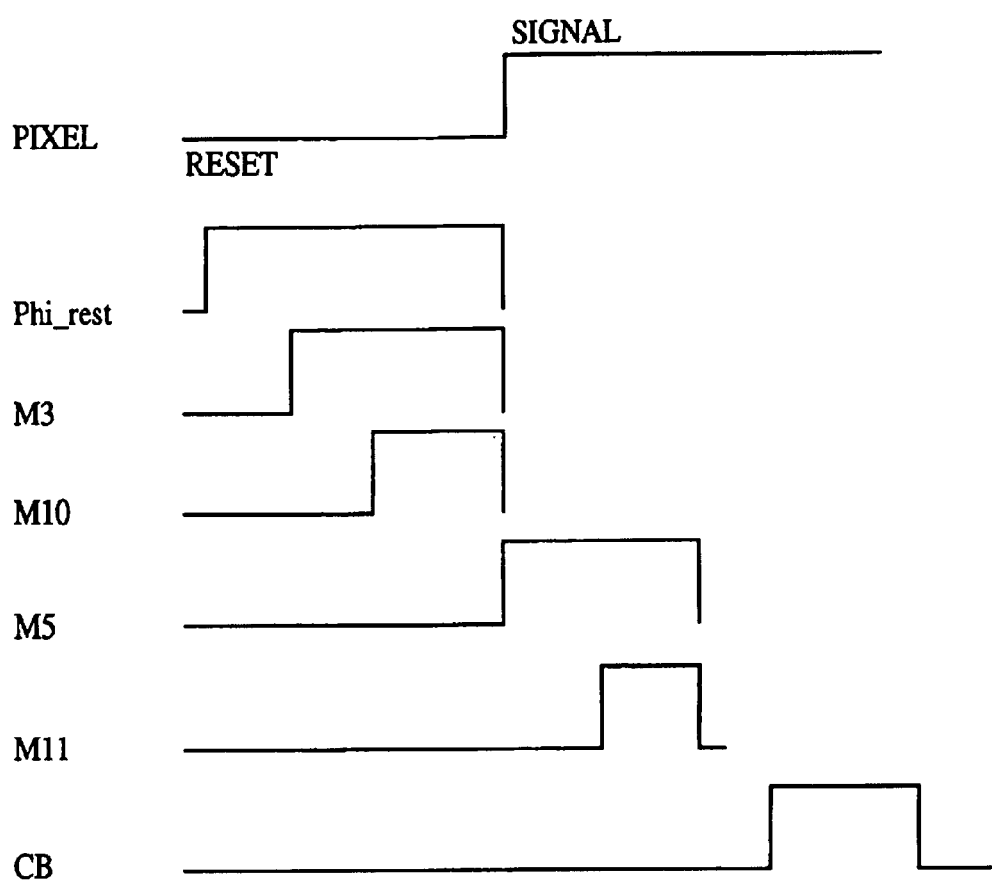
FIG. 3 shows a timing chart of signals in the FIGS. 2A/2B circuit.

Timing of the signals in FIG. 3 controls whether the gain of the circuit is positive or negative. Amplification can be inverted by reversing the order of closure of switches M3 and M5. For example, if the reset level C1 is connected during the reset lo phase and the signal level C2 during amplification, then the final output level is Vos+Vclamp+gain*(Signal-Reset). If the order is reversed, however, the final output level becomes Vos+Vclamp+Gain*(Reset-Signal). This reverses the sense of the signal.

Controller 304 produces the signals to alternate the order of amplification in each successive row. The result is stored in either of the capacitors C5 or C7 if phi_out is active, or C6/C8 if phi_out_2 is active. While the reset level is never stored, the output level can be stored.

For readout, either the top pair of capacitors C5/C6 or the bottom pair of capacitors C7/C8 is shorted using the crowbar scheme described above. The signal circuit in FIG. 4 shows two separate crowbars M12–M14 and M19–M21. Thus, the total output voltage shift is (Vos+Vclamp+Gain*(Signal-Reset)$_{(row\ i)}$−(Vos+Vclamp+Gain*(Reset-Signal)$_{(row\ I+1)}$). Since the clamp voltage Vclamp, the offset voltage Vos, and the Gain are the same in both terns, this reduces to G*(Signal-Reset)$|_{Row}$ i+(Signal-Reset)$|_{Row\ i+1}$.

The amplifier reset level Vos+$V_{CL}$ does not need to be subtracted from each row independently, since that value is always from the FIG. 2A circuit and hence is the same each time. Two independent output stages allow storing the value from one row for addition to the next row without destroying it during the crowbar readout. This enables each pair of rows to be sequentially added. For example, rows 1+2 can be added in the pair C5/C6. Rows 2+3 can be added in the pair C7/C8. Rows 3+4 can be again added in the pair C5/C6.

Although only a few embodiments have been described in detail above, other embodiments are contemplated by the inventor and are intended to be encompassed within the following claims. In addition, other modifications are contemplated and are also intended to be covered.

What is claimed is:

1. An image sensor comprising:

a plurality of image sensor pixels; and a noise reduction circuit, receiving a first and second image part, and outputting a combination of said first and second image parts at a first time, and receiving a third image part and outputting a combination of second and third image parts at a subsequent time, wherein said noise reduction circuit includes at least one noise reducing portion comprising a first passing transistor passing a reset level, a first capacitor storing said reset level, a second passing transistor passing a signal level, a second storage capacitor storing said signal level, and a circuit operating to connect said first and second capacitors, to connect said signal level to said reset level to cause said first and second capacitors to equalize their charge.

2. An image sensor comprising:

a plurality of image sensor pixels;

a noise reduction circuit, receiving a first and second image part, and outputting a combination of said first and second image parts at a first time, and receiving a third image part and outputting a combination of second and third image parts at a subsequent time; and a controller, controlling said noise reduction circuit to selectively obtain one of a value indicative of signal minus reset and a value indicative of reset minus signal for at least one of said image parts.

3. A sensor as in claim 2, wherein said noise reduction circuit includes a first sampling transistor sampling a reset value of a pixel associated with at least one of said first and second image parts, a second sampling transistor sampling a signal value of said pixel, and wherein said controller reverses an order of operating said transistors to select between said value indicative of signal minus reset and said value indicative of reset minus signal for said pixel.

4. A binning sensor, comprising:

a plurality of pixels arranged in an array; and a configurable adder selectively connected to add at least a plurality of adjacent pixel signal values to one another, said configurable adder including an offset reduction circuit for removing certain amplifier offsets from each of adjacent pixel signal values, said offset reduction circuit comprising, for each of said adjacent pixel signal values:

a first passing transistor operating to pass a reset level of a pixel signal value, a first reset holding capacitor holding a reset level of a pixel signal value, a second passing transistor operating to pass a signal level of a pixel signal, and a second holding capacitor operating to store said pixel signal level.

5. A sensor as in claim 4, wherein said offset reduction circuit further comprises, for each of said adjacent pixel signal values, a third passing transistor operating to selectively pass said reset level from said first capacitor and a fourth passing transistor operating to selectively pass said signal level from said second holding capacitor.

6. A sensor as in claim 5, further comprising a controller, producing outputs which control said third and fourth transistors, said outputs controlled in a first direction to produce a first sense signal, and in a second direction to produce a second sense signal.

* * * * *